May 14, 1929.  P. W. SPELL  1,713,197

STALK CUTTER

Filed July 12, 1927  2 Sheets-Sheet 1

Inventor
P. W. SPELL

By C. M. Parker
Attorney

May 14, 1929.　　　P. W. SPELL　　　1,713,197
STALK CUTTER
Filed July 12, 1927　　　2 Sheets-Sheet 2
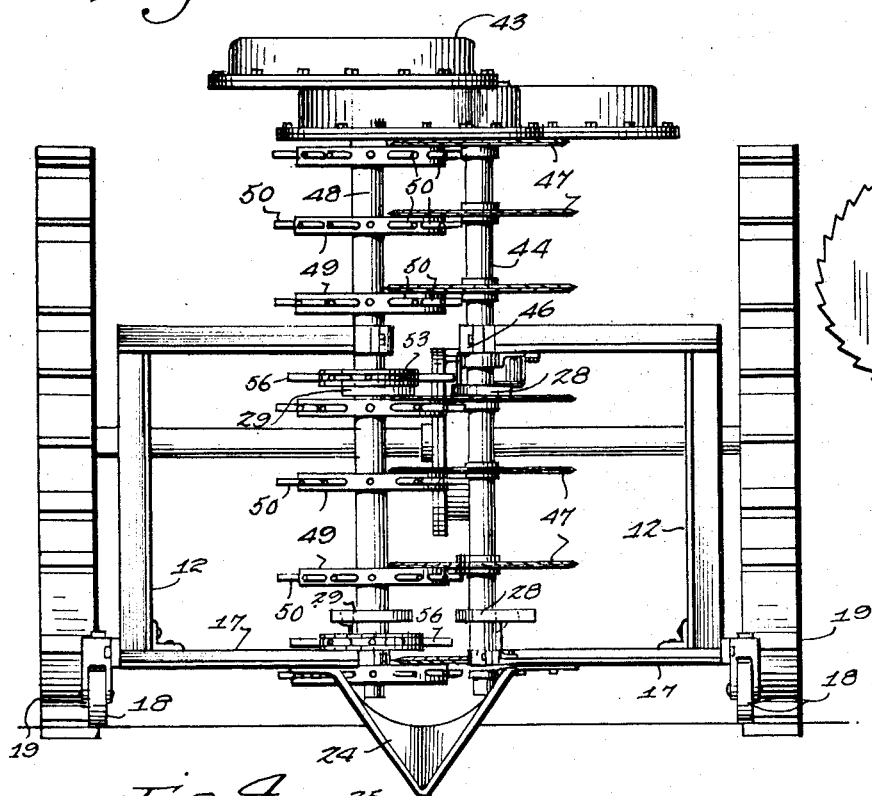
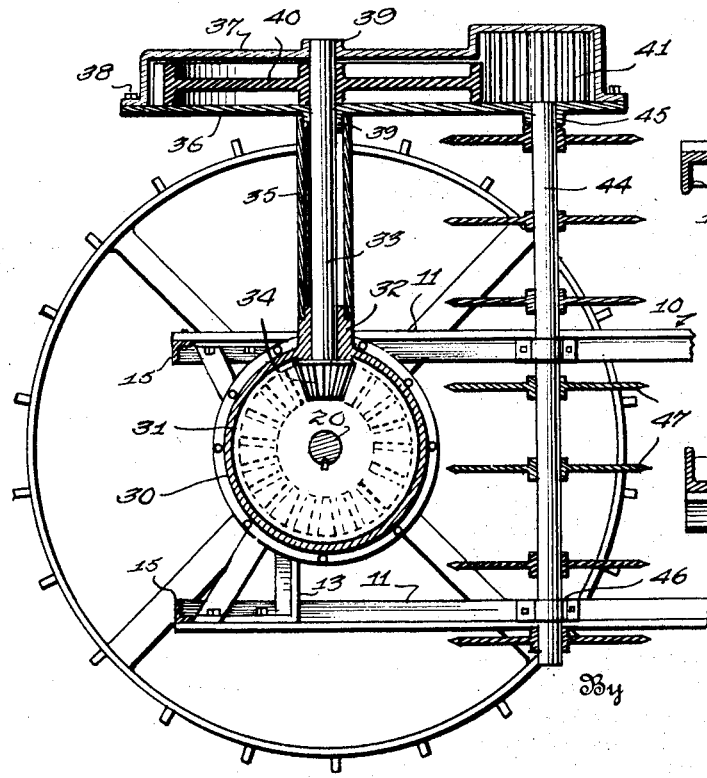
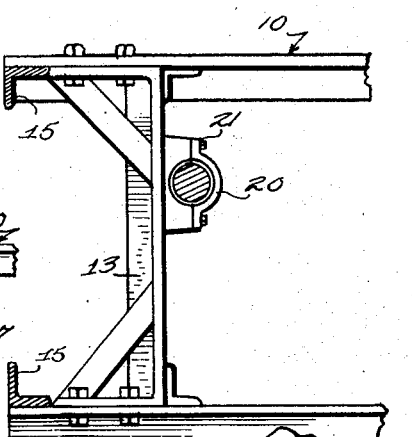
Inventor
P. W. SPELL

Patented May 14, 1929.

1,713,197

UNITED STATES PATENT OFFICE.

PERRY W. SPELL, OF ROSEBORO, NORTH CAROLINA.

STALK CUTTER.

Application filed July 12, 1927. Serial No. 205,190.

This invention relates to stalk cutters.

An important object of the invention is to provide novel means for cutting standing stalks such as those of corn, cotton, and similar plants, whereby the pieces of the stalk are so small as not to interfere with cultivation of the field and may be turned under the soil for fertilizing purposes.

A further object is to provide novel means for lifting the stalks from the ground and and conveying them in an upright position through a series of cutters whereby they may be severed into small pieces.

A further object is to provide novel means having a linear travel substantially equal to the speed of travel of the apparatus over the field for conveying the stalks from the lifting to the cutting means.

A further object is to provide novel cutting devices and novel means for feeding the stalks to the cutting devices.

A further object is to provide novel drive means for the cutters and the feed means therefor.

A further object is to provide novel guide means associated with the conveyor for holding the stalks in upright position as they are lifted and conveyed to the cutters.

Other objects and advantages of the invention will become apparent during the course of the following description.

In the drawings I have shown one embodiment of the invention. In this showing,

Figure 3 is a front elevation,

Figure 4 is a section substantially on line 4—4 of Figure 2,

Figure 5 is a detail section on line 5—5 of Figure 1, and,

Figure 6 is a similar view on line 6—6 of Figure 2.

Figure 1:
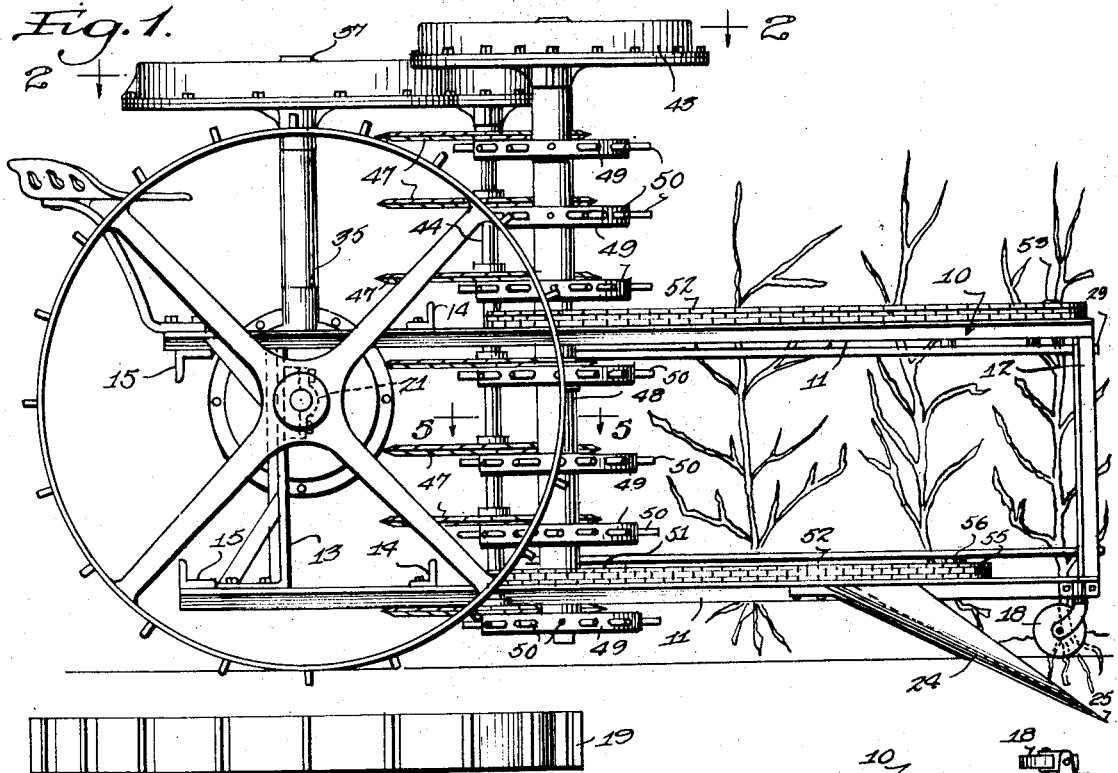
Figure 1 is a side elevation.

Referring to the drawings, the numeral 10 designates a pair of side frame members each including upper and lower rails 11. These rails may be connected at their ends by vertical posts 12 and 13 and the side frame members are connected to each other by transverse connecting bars or rails 14 and 15. Inner parallel upper and lower rails 16 are arranged within the frame and are connected at their rear ends to the tranverse rails 14 and 15. The forward ends of the rails 16 are connected to inwardly extending arms 17 carried by the upper and lower portions of the side frames.

Figure 2:
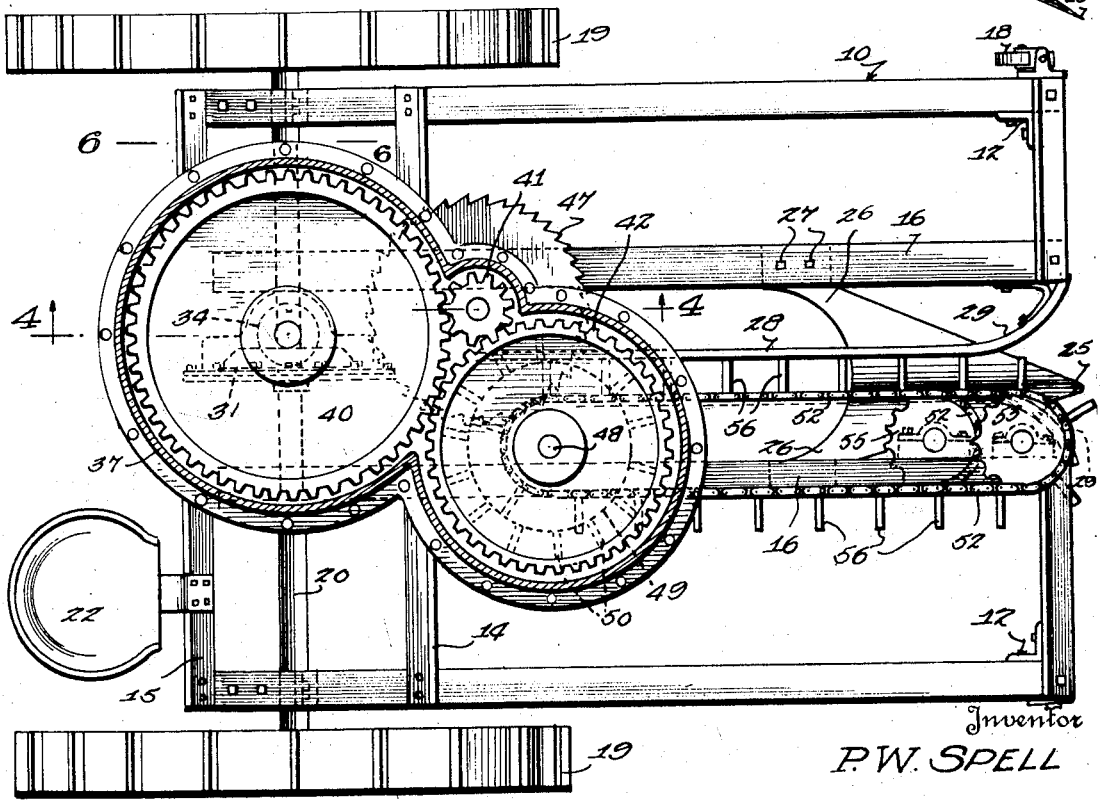
Figure 2 is a plan view, parts being shown in section.

The elements just described constitute the body portion of the apparatus which may be supported at its forward end for movement over the ground by wheels or casters 18. At its rear end, the body is supported by relatively large cleated wheels 19 mounted upon a transverse axle 20 journalled in bearings 21 carried by the rear vertical members 13. If desired, the apparatus may be provided with an operator's seat 22, and may be propelled over the ground in any desired manner. As the device travels through a field, it is adapted to lift stalks 23 from the ground by means of a lifting member 24 having a pointed forward end 25, as shown in Figures 2 and 3. The lifting member is preferably arcuate in cross-section and includes a pair of rear outwardly diverging arms 26 secured to the rails 16 by rivets or the like 27. Stalks lifted by the member 24 are adapted to move rearwardly through the apparatus and are guided in their movement by upper and lower pairs of opposite substantially parallel guides 28 having their forward ends 29 curved outwardly. These guides may be suitably secured to the body of the apparatus, as will be apparent.

The axle 20 is provided intermediate its ends with a gear housing 30, a bevel gear 31 being arranged in this housing and secured to the axle 20 to rotate therewith. The upper portion of the housing 30 is provided with a bearing 32 in which is journalled a vertical shaft 33 having a bevel pinion 34 at its lower end meshing with the gear 31.

A supporting sleeve 35 surrounds the shaft 33 and is secured at its lower end to the bearing 32. The upper end of this sleeve supports a plate 36 forming a part of a relatively large horizontally arranged gear casing 37. The elements of this gear casing may be secured together by bolts 38. The upper and lower portions of the gear housing are provided with bearings 39 rotatably receiving the upper end of the shaft 33, and this shaft is provided within the gear housing 37 with a relatively large gear 40. The gear 39 meshes with a small gear or pinion 41 which is substantially double the thickness of the gear 37. The pinion 41 also meshes with another gear 42 to drive the latter, and this gear and the upper portion of the pinion 41 are arranged in an elevated portion 43 of the gear casing 37.

The pinion 41 is mounted on the upper end of a shaft 44, the upper end of which is journalled in a bearing 45 formed in the lower wall of the gear housing 37. The lower end of this shaft is journalled in a bearing 46 carried by one of the rails 16. At spaced intervals, the shaft 44 is provided with circular saw blades 47, for a purpose to be described.

The gear 42 is mounted upon a shaft 48 arranged parallel to the shaft 44 and journalled in suitable bearings carried by one pair of frame members 16. At spaced intervals, adjacent each saw blade 47, the shaft 48 is provided with disks 49 having radial pins 50 projecting therefrom. The shaft 48 also is provided with upper and lower sprockets 51 about which endless chains 52 pass. The upper chain 52 extends to a point near the forward end of the frame, and passes around a sprocket 53 mounted upon a shaft 54. The lower chain 52 also passes around a forward sprocket 55 mounted upon a shaft 56. At spaced intervals the chains 52 are provided with projections 56, the projections on the inner runs of the chains substantially coinciding with the space between the guides 28.

The operation of the apparatus is as follows:

The body of the apparatus will be supported upon the forward and rear wheels and may be propelled over the ground in any suitable manner. The device is moved over the ground with a row of stalks in alinement with the space between the guides 28 whereby the stalks will move thereinto as the vehicle progresses. The roots of the stalk will be lifted from the ground by the member 24 so that the complete plant will be elevated as shown in Figure 1. The stalks will be guided in their rearward movement by the guides 28 and will be held in upright position by the projections 56 of the conveyor chains 52, these elements constituting the conveying means. The stalks obviously will be held in upright position inasmuch as the conveyor chains travel at equal speeds. The gearing employed is preferably such that the rearward linear speed of the inner runs of the chain 52 will be equal to the linear speed of the apparatus as it passes over the ground, and accordingly there will be no tendency for the stalks to be thrown out of their vertical positions.

The movement of the apparatus over the ground obviously rotates the axle 20 which drives the shaft 33 through the bevel gear 31 and pinion 34. The rotation of the shaft 33 drives the large gear 40, and the pinion 41 will be driven from the latter at a relatively high speed to rotate the saw blades 47. Since the gear 42 is materially larger than the pinion 41, it will be driven thereby at a relatively slow speed. The gear ratio is preferably such as to provide the speed of travel of the chains, previously referred to. As the stalks move rearwardly between the guides 28 they will be successively engaged by the projections 50 of the disks 49, one of these disks being arranged adjacent each of the saw blades 47 to force or feed the stalks thereagainst. The rapid rotation of the saw blades efficiently cuts the stalks and the pieces thereof fall to the ground as will be apparent. These pieces of stalk are preferably relatively short so as not to interfere with cultivation of the ground, and may be turned under where they will rot and afford fertilization for the soil.

It is to be understood that the form of the invention herewith shown and described is to be taken as a preferred example of the same and that various changes in the shape, size and arrangement of parts may be resorted to without departing from the spirit of the invention or the scope of the subjoined claims.

I claim:

1. A stalk cutter comprising a stalk lifting device, a plurality of guides arranged above and on opposite sides of said lifting device, upper and lower conveying means including a plurality of spaced projections adapted to travel parallel to said guides, a vertical shaft arranged adjacent the rear ends of said guides, and a plurality of spaced cutting members carried by said shaft, the speed of said upper and lower conveying means being equal.

2. A stalk cutter comprising a stalk lifting device, a plurality of guides arranged above and on opposite sides of said lifting device, upper and lower conveying means including a plurality of spaced projections adapted to travel parallel to said guides, a vertical shaft arranged adjacent the rear ends of said guides, a plurality of spaced cutting members carried by said shaft, and a feeding member arranged adjacent each of said cutting members and adapted to feed the stalks thereagainst, the speed of said upper and lower conveying means being equal.

3. A stalk cutter comprising a pair of side frame members arranged parallel to each other and spaced at their forward ends, supporting wheels arranged adjacent the rear ends of said frame members, an axle connecting said wheels, a stalk lifting device arranged beneath and between said frame members and connected thereto adjacent their forward ends, upper and lower parallel guides arranged between said frame members and extending from the front toward the rear thereof, upper and lower conveying means adapted to engage the stalks uprooted by said lifting device and including projections adapted to travel rearwardly between and parallel to said guides, a plurality of vertically spaced cutting members arranged adjacent the rear end of said conveying means, and driving means connecting said axle to said conveying means and said cutting members, the speed of said upper and lower conveying means being equal and being regulated by the speed of said wheels whereby the stalks will be carried by said conveying means in an upright position.

4. A stalk cutter comprising a pair of side frame members arranged parallel to each other and spaced at their forward ends, supporting wheels arranged adjacent the rear ends of said frame members, an axle connecting said wheels, a stalk lifting device arranged beneath and between said frame members and connected thereto adjacent their forward ends, upper and lower parallel guides arranged between said frame members and extending from the front toward the rear thereof, upper and lower conveyor chains arranged to one side of the space between said frame members and provided with outstanding projections adapted to travel rearwardly between and parallel to said guides, forward and rear sprockets about which said conveyor chains pass, a pair of vertical shafts, a plurality of vertically spaced cutting members carried by one of said shafts, said rear sprockets being carried by the other of said shafts, and drive means connected between said axle and said shafts, the speed of said upper and lower conveyor chains being equal and being regulated by the speed of said wheels whereby the stalks will be carried in an upright position between said upper and lower conveyor chains.

5. A stalk cutter comprising a pair of side frame members arranged parallel to each other and spaced at their forward ends, supporting wheels arranged adjacent the rear ends of said frame members, an axle connecting said wheels, a stalk lifting device arranged beneath and between said frame members and connected thereto adjacent their forward ends, upper and lower parallel guides arranged between said frame members and extending from the front toward the rear thereof, upper and lower conveying means adapted to engage the stalks uprooted by said lifting device and including projections adapted to travel rearwardly between and parallel to said guides, a pair of vertical shafts arranged adjacent the rear end of said conveying means, a plurality of vertically spaced cutting members carried by one of said shafts, a feed member arranged adjacent each of said cutting members and adapted to feed the stalks thereagainst, said feed members being carried by the other of said shafts, and driving means connecting said axle to said conveying means and said shafts, the speed of said upper and lower conveying means being equal and being regulated by the speed of said wheels whereby the stalks will be carried by said upper and lower conveying means in an upright position.

6. A stalk cutter comprising a pair of side frame members arranged parallel to each other and spaced at their forward ends, supporting wheels arranged adjacent the rear ends of said frame members, an axle connecting said wheels, a stalk lifting device arranged beneath and between said frame members and connected thereto adjacent their forward ends, upper and lower parallel guides arranged between said frame members and extending from the front toward the rear thereof, upper and lower conveyor chains arranged to one side of the space between said frame members and provided with outstanding projections adapted to travel rearwardly between and parallel to said guides, forward and rear sprockets about which said conveyor chains pass, a pair of vertical shafts, a plurality of vertically spaced cutting members carried by one of said shafts, said rear sprockets being carried by the other of said shafts, a feed member arranged adjacent each of said cutting members and adapted to feed the stalks thereagainst, said feed members being carried by the last mentioned shaft, and drive means connected between said axle and said shafts, the speed of said upper and lower conveyor chains being equal and being regulated by the speed of said wheels whereby the stalks will be carried in an upright position between said upper and lower conveyor chains.

7. A stalk cutter comprising a pair of side frame members arranged parallel to each other and spaced at their forward ends, supporting wheels arranged adjacent the rear ends of said frame members, an axle connecting said wheels, a stalk lifting device arranged beneath and between said frame members and connected thereto adjacent their forward ends, upper and lower parallel guides arranged between said frame members and extending from the front toward the rear thereof, upper and lower conveyor chains arranged to one side of the space between said frame members and provided with outstanding projections adapted to travel rearwardly between and parallel to said guides, forward and rear sprockets about which said conveyor chains pass, a pair of vertical shafts, a plurality of vertically spaced cutting members carried by one of said shafts, and drive means connected between said axle and said shafts, said drive means comprising a pinion carried by said first named shaft, a gear meshing therewith and carried by the other shaft, a drive shaft, a gear carried by said drive shaft and meshing with said pinion, a bevel pinion carried by said drive shaft, and a bevel gear carried by said axle and meshing with said bevel pinion, the speed of said upper and lower conveying means being equal and being regulated by the speed of said wheels whereby the stalks will be carried by said conveying means in an upright position.

In testimony whereof I affix my signature.

PERRY W. SPELL.